United States Patent [19]

Horiuchi et al.

[11] Patent Number: 4,664,208
[45] Date of Patent: May 12, 1987

[54] SIX-WHEELED MOTOR VEHICLE

[75] Inventors: Tadanori Horiuchi; Masaki Watanabe, both of Saitama, Japan

[73] Assignee: Honda Giken Kogyo Kabushiki Kaisha, Tokyo, Japan

[21] Appl. No.: 620,361

[22] Filed: Jun. 13, 1984

[30] Foreign Application Priority Data

Jun. 13, 1983 [JP] Japan .................................. 58-104271

[51] Int. Cl.⁴ ............................................ B62D 61/10
[52] U.S. Cl. ...................................... 180/23; 180/22; 180/233; 180/252; 180/15
[58] Field of Search ...................... 180/22, 23, 24, 233, 180/24.11, 244, 252, 15

[56] References Cited

U.S. PATENT DOCUMENTS

| | | | |
|---|---|---|---|
| 700,926 | 0/1902 | Hicks | 180/22 |
| 1,357,192 | 10/1920 | Smith | 180/22 X |
| 1,727,721 | 9/1929 | Langlands et al. | 180/22 |
| 1,733,356 | 10/1929 | Mossay | 180/22 X |
| 1,984,958 | 12/1934 | Barske | 180/22 X |
| 3,506,079 | 4/1970 | Madler et al. | 180/22 |
| 3,893,533 | 7/1975 | Tidwell | 180/233 |

Primary Examiner—Henry A. Bennet
Attorney, Agent, or Firm—Lyon & Lyon

[57] ABSTRACT

A six-wheeled motor vehicle has a pair of front wheels, a pair of middle wheels and a pair of rear wheels. These six wheels are supported on a frame and driven by an engine. The vehicle has the arrangement in which the engine is disposed between the axles of the middle wheel and the rear wheel, or, in a second embodiment, between the axles of the front wheel and the middle wheel. A footrest is disposed between the front wheel and the middle wheel in the first embodiment, and between the middle wheel and the rear wheel in the second embodiment. Due to this arrangement, the load on each wheel is substantially equalized with each other.

10 Claims, 12 Drawing Figures

SIX-WHEELED MOTOR VEHICLE

BACKGROUND OF THE INVENTION

1. Field of the Invention

The present invention relates to a six-wheeled motor vehicle, and more particularly, to a six-wheeled motor vehicle suitable for off-road running.

2. Description of the Relevant Art

Recently, there are an increasing number of people who take pleasure from running off road by a motocross cycle or a buggy car. Such people would love to run on ground of even worse condition than heretofore possible and have been longing for a vehicle which enables running on such ground.

SUMMARY OF THE INVENTION

It is therefore an object of the present invention to provide a vehicle having good drivability upon running on ground of extremely bad condition.

It is another object of the present invention to provide a vehicle having six wheels, the arrangement of which is such that the load supported by one wheel is generally equal with the load supported by another wheel.

It is further object of the present invention to provide a six-wheeled vehicle, wherein a pair of front wheels and a pair of rear wheels are supported by swinging arms so that sufficient drivability is obtained by using a more simple structure for the wheel suspension.

According to the preferred embodiment of the present invention, the six-wheeled motor vehicle comprises a frame, a pair of front wheels provided with front axles, a pair of rear wheels provided with rear axles, a pair of middle wheels provided with middle axles and disposed between the front wheels and the rear wheels, support means for supporting the front, middle and rear wheels on the frame, drive means for driving the front, middle and rear wheels, the drive means including an engine mounted on the frame, a pair of footrests, and steering means. The engine is disposed between the middle axles and the rear axles, and adjacent the middle axles. The footrests are disposed between the front wheels and the middle wheels.

According to an alternate embodiment of the present invention, the six-wheeled motor vehicle comprises a frame, a pair of front wheels provided with front axles, a pair of rear wheels provided with rear axles, a pair of middle wheels provided with middle axles and disposed between the front wheels and the rear wheels, support means for supporting the front, middle and rear wheels on the frame, drive means for driving the front, middle and rear wheels, the drive means including an engine mounted on the frame between the front axles and the middle axles adjacent the middle axles, a pair of footrests and steering means. The footrests are disposed between the middle wheels and the rear wheels.

The above and further objects, details and advantages of the present invention will become apparent from the following detailed description of the preferred alternate embodiments thereof, when read in conjunction with the accompanying drawing.

DESCRIPTION OF THE PREFERRED EMBODIMENT

1. Overall Construction

Figure 1:
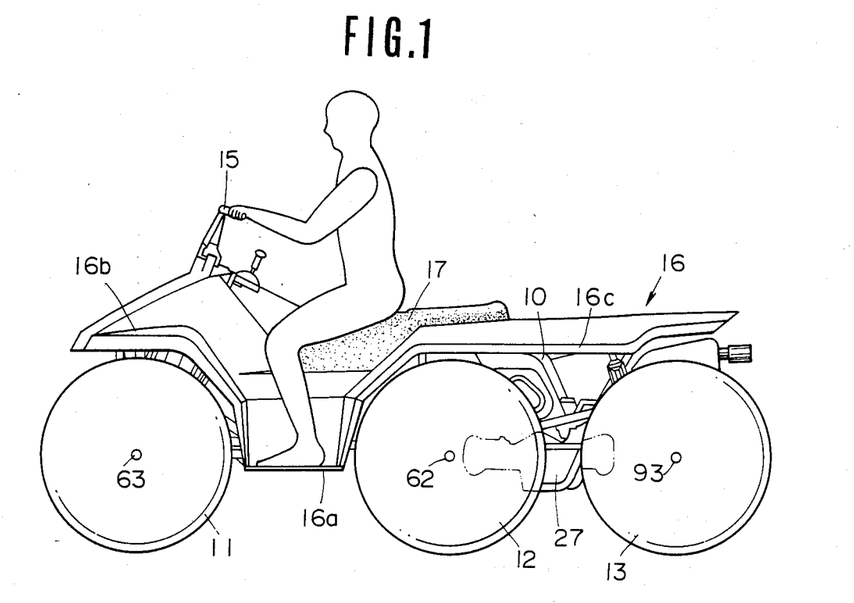
FIG. 1 is a side elevational view of a six-wheeled motor vehicle according to the preferred embodiment of the present invention.
Figure 2:
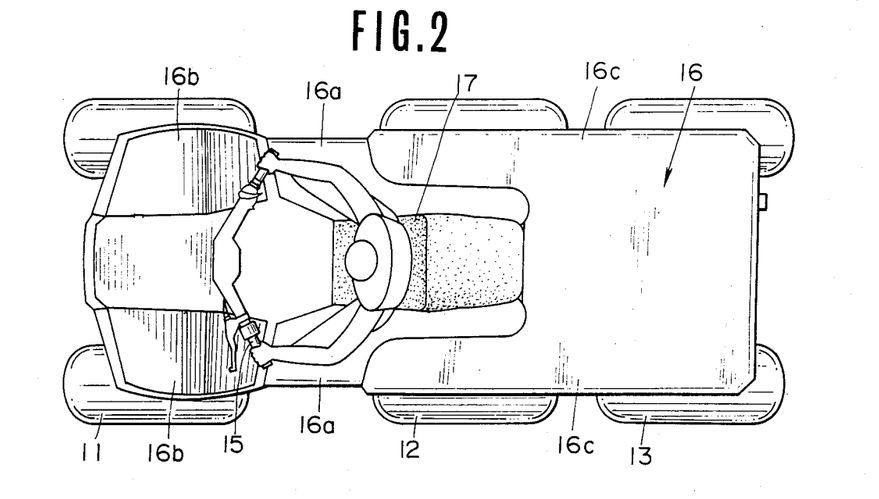
FIG. 2 is a plan view of the vehicle shown in FIG. 1.

FIGS. 1 through 10 show a six-wheeled motor vehicle according to the preferred embodiment of the present invention. As shown in FIGS. 1 and 2, the vehicle has a pair of front wheels 11, a pair of middle wheels 12 and a pair of rear wheels 13 supported on a frame 10. Each of these wheels has a low-pressure tire suitable for off-road running and is driven by an engine 27 mounted on the frame 10, which engine 27 is disposed between the axles of the middle wheel 12 and the rear wheel 13, and adjacent the axle of the middle wheel 12. The front wheels 11 and the rear wheels 13 are steerable by the operation of a bar-shaped steering handle 15. The vehicle has a covering body 16 and a saddle seat 17 mounted on the frame 10. The saddle seat 17 is similar to one on an ordinary motorcycle for allowing an operator to sit astride thereon, and disposed generally centrally of the body 16. The body 16 has foot-rests 16a, front fenders 16b and rear fenders 16c formed integrally therewith. The foot-rests 16a are positioned between the front wheels 11 and the middle wheels.

2. Frame

Figure 3:
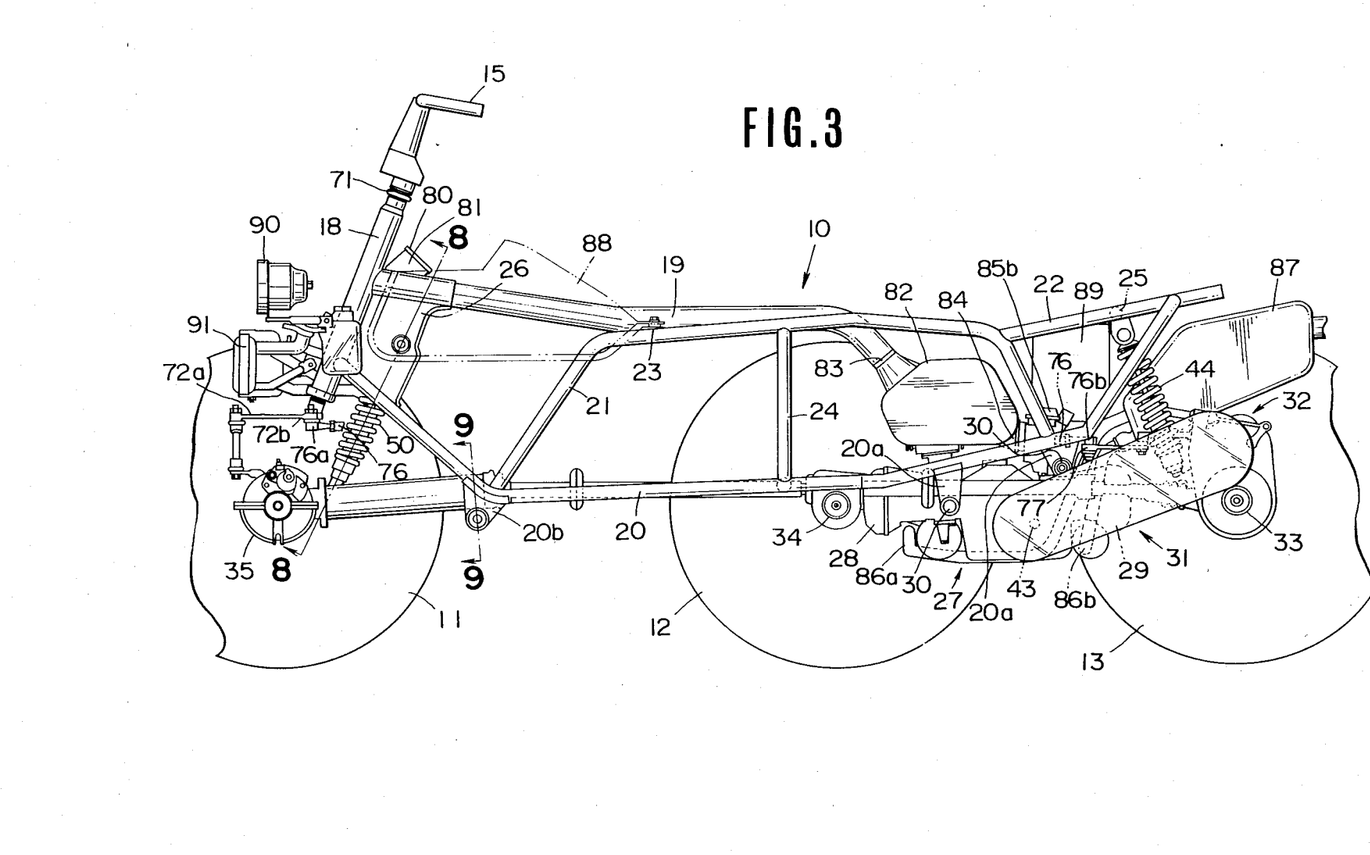
FIG. 3 is a side elevational view of a frame construction of the vehicle shown in FIG. 1.
Figure 4:
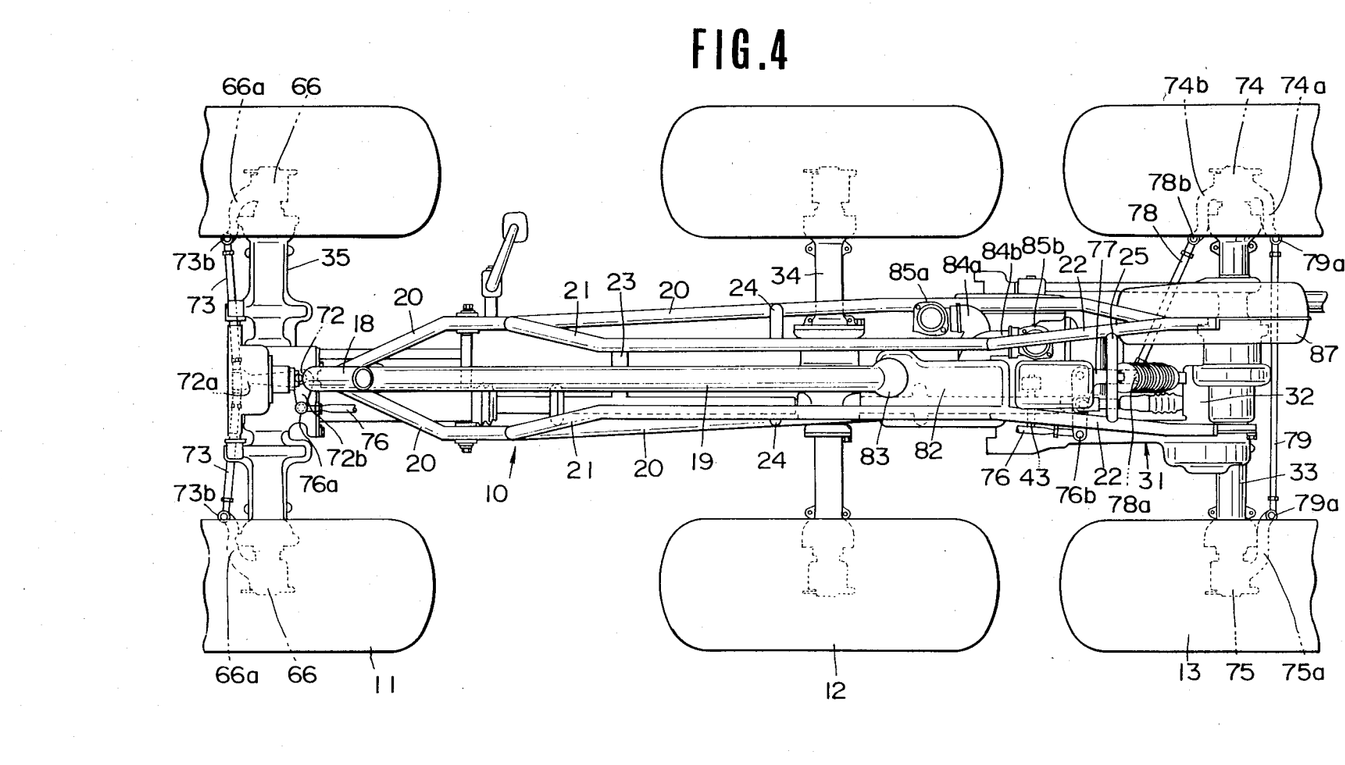
FIG. 4 is a plan view of the frame construction shown in FIG. 3.

As shown in FIGS. 3 and 4, the frame 10 of the vehicle has the construction similar to that of a pipe frame for a motorcycle, that is, it comprised a head tube 18, a backbone tube 19, a pair of down tubes 20, a pair of side tubes 21 and a pair of rear stays 22. The head tube 18 for supporting a steering stem 71 is disposed at the upper front portion of the frame 10. The back bone tube 19 extends longitudinally and has the front end thereof secured to the head tube 18 and the rear end thereof slightly curved downwardly. The right and left down tubes 20 extend longitudinally to form the lower portion of the frame 10, and each down tube 20 has the front end thereof curved upwardly to be secured to the lower portion of the head tube 18 and the rear end thereof curved upwardly as well. The right and left side tubes 21 extend longitudinally to form the upper portion of the frame 10 together with the backbone tube 19, and each side tube 21 has the front end thereof curved downwardly to be secured to the front bent portion of the down tube 20 and the rear end thereof also curved downwardly to be secured to the rear bent portion of the down tube 20. The side tubes 21 are connected at intermediate portions thereof with the backbone tube 19 through a front cross member 23, while each side tube 21 is connected at another intermediate portion thereof with the intermediate portion of the down tube 20 at respective side, through a generally vertically extending reinforcement member 24. The rear stays 22 extend longitudinally to from the upper rear portion of the frame 10, and each rear stay 22 has the front end thereof secured to the rear bent portion of the side tube 21 and the rear portion thereof secured to the rear end of the down tube 20. The rear stays are connected at intermediate portion thereof with each other through a rear cross member 25. The head tube 18 is provided with a gusset 26 which reinforces the connection of the head tube 18 with the backbone tube 19 and the down tubes 20.

3. Outline of Power Transmitting System and Suspension System

Each of the pair of front wheels and the pair of rear wheels is suspended to the frame through a swing arm having a single shock absorber, and the pair of middle wheels is rigidly supported on the frame. The vehicle is provided with three axle housings, one for each pair of wheels. Each axle housing contains a differential of a conventional type and a pair of axles for connecting the differential with the shafts of wheels. The three differentials are connected to one another through a power transmitting shaft extending longitudinally of the vehicle. Further, the front axle housing and the rear axle housing constitute a part of the front swing arm and a part of the rear swing arm, respectively.

4. Details of Power Transmitting System

As shown in FIGS. 3 and 4, the power unit of the vehicle comprises a horizontal water-cooled two-cylinder engine 27 having cylinders 28, 29 extending horizontally in forward and rearward directions, respectively, and a belt transmission 31 and a speed change gear assembly 32 disposed rearward of the engine 27. As shown in FIG. 3, the engine 27 is attached by rubber mounts 30 to brackets 20a of the down tubes 20. Power from the engine 27 can be changed in speed continuously in a stepless manner by the belt transmission 31, connected and disconnected automatically by a clutch, (not shown) incorporated in the belt transmission 31, and selectively modified by the speed change gear assembly 32 into three-speed forward modes, a neutral mode and one-speed reverse mode. Output power from the speed change gear assembly 32 is transmitted through a rear differential 40 to the rear wheels 13, and also transmitted to the front wheels 11 and the middle wheels 12 through a front differential 38 and a middle differential 39, respectively, which differentials 38, 39 are connected with the rear differential 40 through a power transmitting shaft 41.

Figure 5:
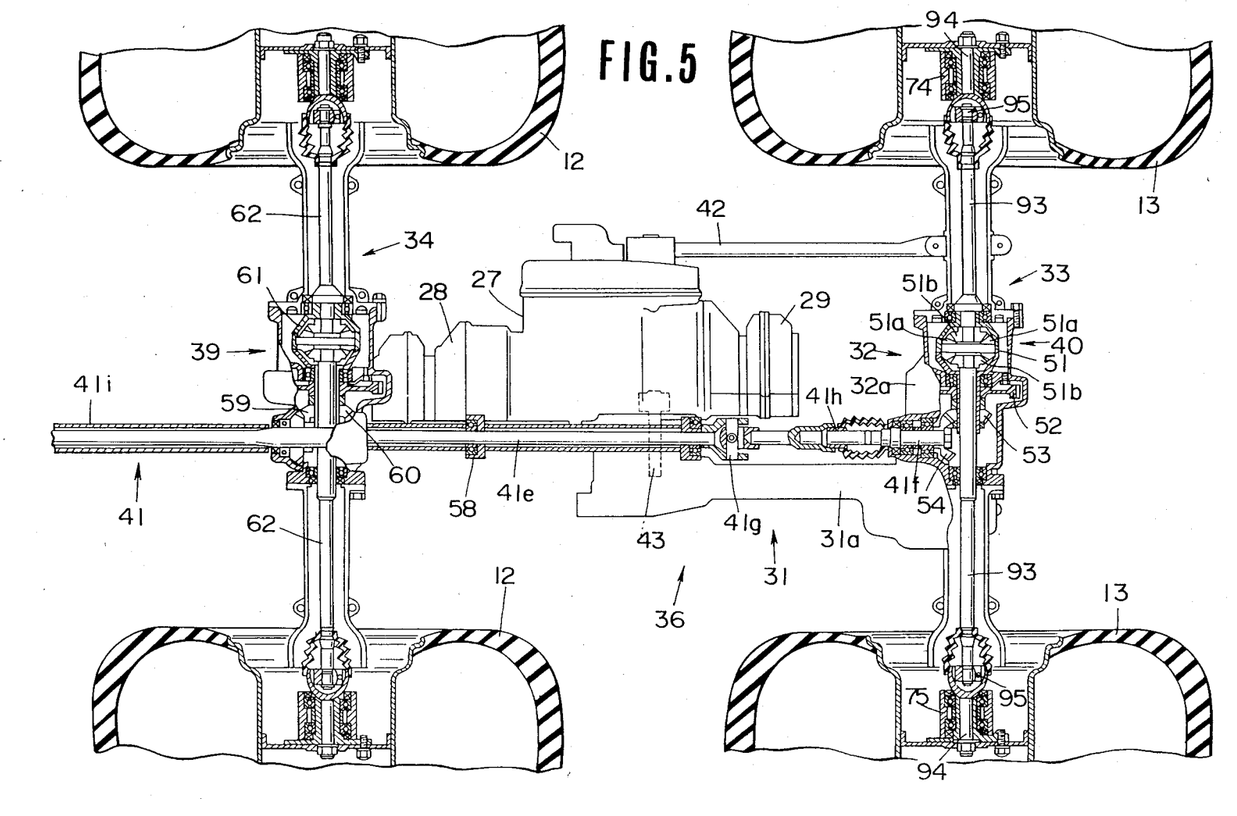
FIGS. 5 and 6 are cross-sectional plan views of the vehicle shown in FIG. 1 illustrating a power transmitting system.

The three differentials have similar constructions to each other, so that only the construction of the rear differential 40 is described hereinafter. As shown in FIG. 5, the rear differential 40 has a differential gear box 51 rotatably supported in the rear axle housing 33. To the gear box 51 is fixedly connected a final gear 52 engaging with the gear (not shown) of the speed change gear assembly 32 for receiving the power of the engine, as well as a bevel gear 53 engaging with the bevel gear 54 secured at the rear end of the power transmitting shaft 41. The gear box 51 houses a pair of smaller differential gears 51a and a pair of larger differential gears 51b which are held in mesh with adjacent ones. Each larger differential gear 51b is fixedly connected with the one end of a rear axle 93, the other end of which is connected to a shaft 95 of the rear wheel 13.

Figure 6:
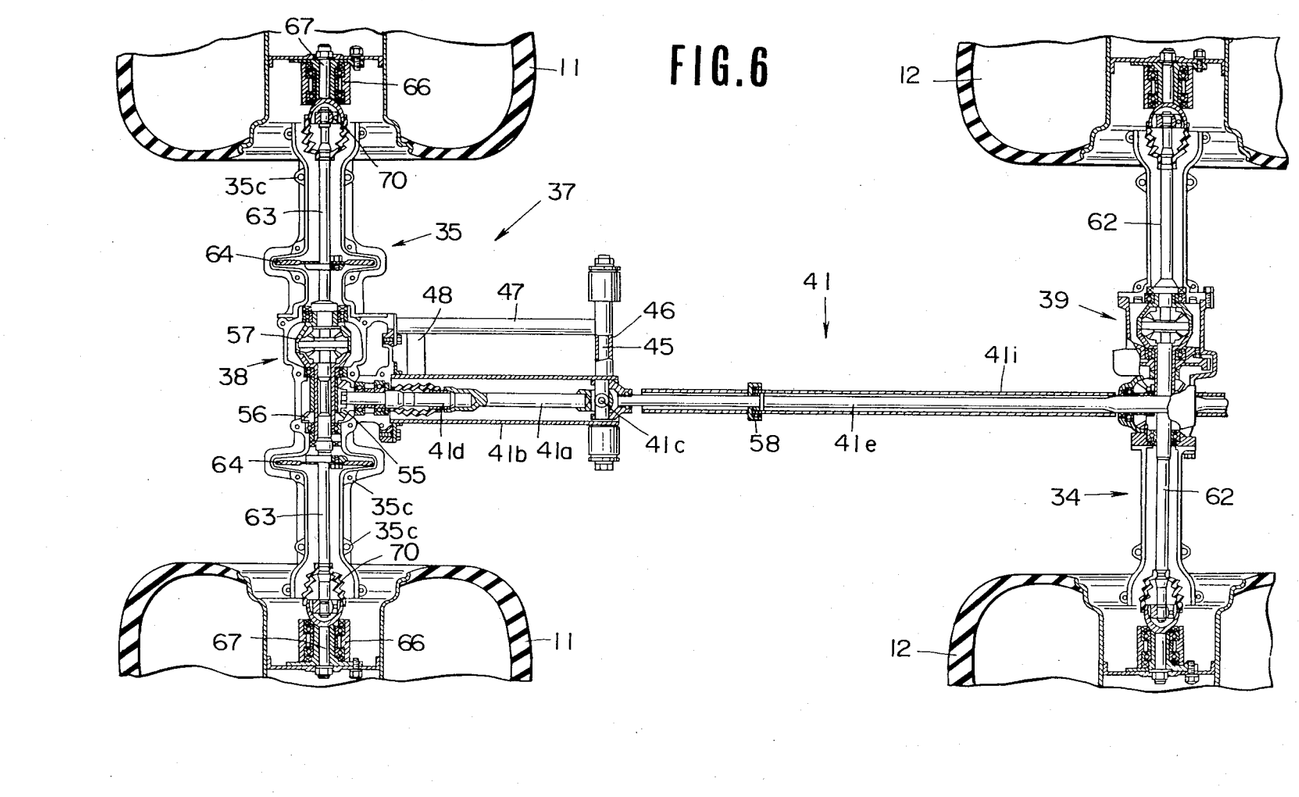
Figure 7:
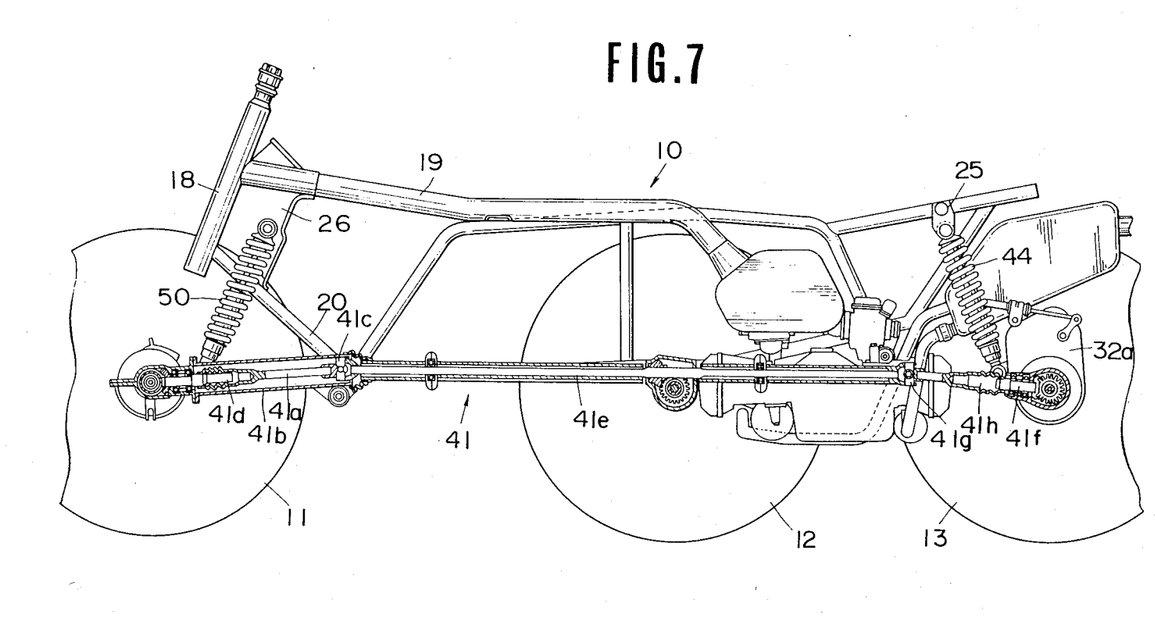
FIG. 7 is a cross-sectional side view of the vehicle shown in FIG. 1 illustrating the power transmitting system; shown in FIG. 1

As shown in FIGS. 5 through 7, the power transmitting shaft 41 is disposed longitudinally of the vehicle so as to interconnect the front, middle and rear differentials 38, 39, 40 with each other and to transmit power therebetween. The power transmitting shaft 41 includes two constant-velocity joints 41c, 41g and two splined sliding joints 41d, 41h, and a front power shaft 41a, a middle power shaft 41e and a rear power shaft 41f, which are jointed in series through the constant-velocity joints 41c, 41g.

The front power shaft 41a is contained in front power shaft casing 41b, constituting a part of a front leading arm 37, so that the front power shaft 41a is intergrally swingable with the front leading arm 37. The front power shaft is provided at the front end thereof with a bevel gear 55 engaging with a bevel gear 56 fixedly mounted on a gear box 57 of the front differential 38. The front power shaft has the splined sliding joint 41d provided at the intermediate portion thereof, and is connected at the rear end thereof to the front end of the middle power shaft 41e through the constant-velocity joint 41c.

The middle power shaft 41e has the front and rear portions thereof supported on the frame through bearings 58, and the intermediate portion thereof rotatably fitted in the middle axle housing 34. The middle power shaft is provided with a bevel gear 59 engaging with a bevel gear 60 fixedly mounted on a gear box 61 of the middle differential 39. These bevel gears 59, 60 are formed as a pair of offset bevel gears, wherein the centers thereof are vertically set off from each other, so as to prevent the interference between the middle power shaft 41e and a middle axle 62. The middle power shaft is covered with middle power shaft casings 41i for protection, and connected at the rear end thereof to the front end of the rear power shaft 41f through the constant-velocity joint 41g.

The rear power shaft 41f is rotatably secured to the rear axle housing 33 constituting a part of a rear trailing arm 36, so that the rear power shaft is integrally swingable with the rear trailing arm 36. The rear power shaft is provided at the intermediate portion thereof with the splined sliding joint 41h, and at the rear end thereof with the bevel gear 54 which engages, as described above, with the bevel gear 53 fixedly mounted on the gear box 51 of the rear differential 40.

5. Details of Suspension System

As shown in FIG.5, the rear trailing arm 36, by which the rear wheels 13 are supported vertically swingably, is composed of a casing 31a of the belt transmission 31, a casing 32a of the speed change gear assembly 32, the rear axle housing 33 and a side rod 42. The casing 32a of the speed change gear assembly is fixedly secured with the casing 31a of the belt transmission and the rear axle housing 33 by bolting, and the side rod 42 is fixedly connected at the rear end thereof with the rear axle housing 33 by bolting, whereby these elements are fixedly combined with each other. The engine 27 has an output shaft 43 which is projected laterally horizontally from the left side of the casing of the engine 27. The casing 31a of the belt transmission is attached to the output shaft 43 of the engine through a bearing and supported by the output shaft 43, while the front end of the side rod 42 is connected to the right side of the casing of the engine 27 in a manner to be swingable about the point aligned with the axis of the output shaft 43 of the engine. Due to this arrangement, the rear trailing arm 36 is connected to the engine 27 while being vertically swingable about the axis coaxial with the output shaft 43 of the engine 27. As shown in FIG. 7, the rear trailing arm is provided with a rear shock absorber 44 which has the lower and upper ends thereof pivotably connected to the casing 32a of the speed change gear assembly and the rear cross member 25 of the frame 10, respectively, whereby the rear trailing arm 36 is suspended from the frame 10.

As shown is FIGS. 6 through 9, the front loading arm 37, by which the front wheels 11 are supported vertically swingably, is comprised of a sleeve 46, into which is inserted a pivot shaft 45 extending laterally horizontally, the front power shaft casing 41b, a side rod 47, the front axle housing 35 and a cross member 48. The front power shaft casing 41b and the side rod 47 extend substantially longitudinally, and have the front ends thereof fixedly connected with the front axle housing 35 and the rear ends thereof fixedly connected with the sleeve 46. The cross member 48 is disposed at the back of the front axle housing 35 and has the right and left ends thereof connected to the side member 47 and the front power shaft casing 41b, respectively. Each end of the pivot shaft 45 for the front leading arm 37 is fixed to a bracket 20b of the down tube 20 through a rubber mount 49, whereby the front leading arm 37 is vertically swingably connected to the frame 10. The front leading arm 37 is provided with a front shock absorber 50 which has the lower and upper ends thereof pivotably connected to the cross member 48 of the front leading arm and the gusset 26 of the frame 10, respectively, whereby the front leading arm 37 is suspended from the frame.

6. Brake System

Figure 10:
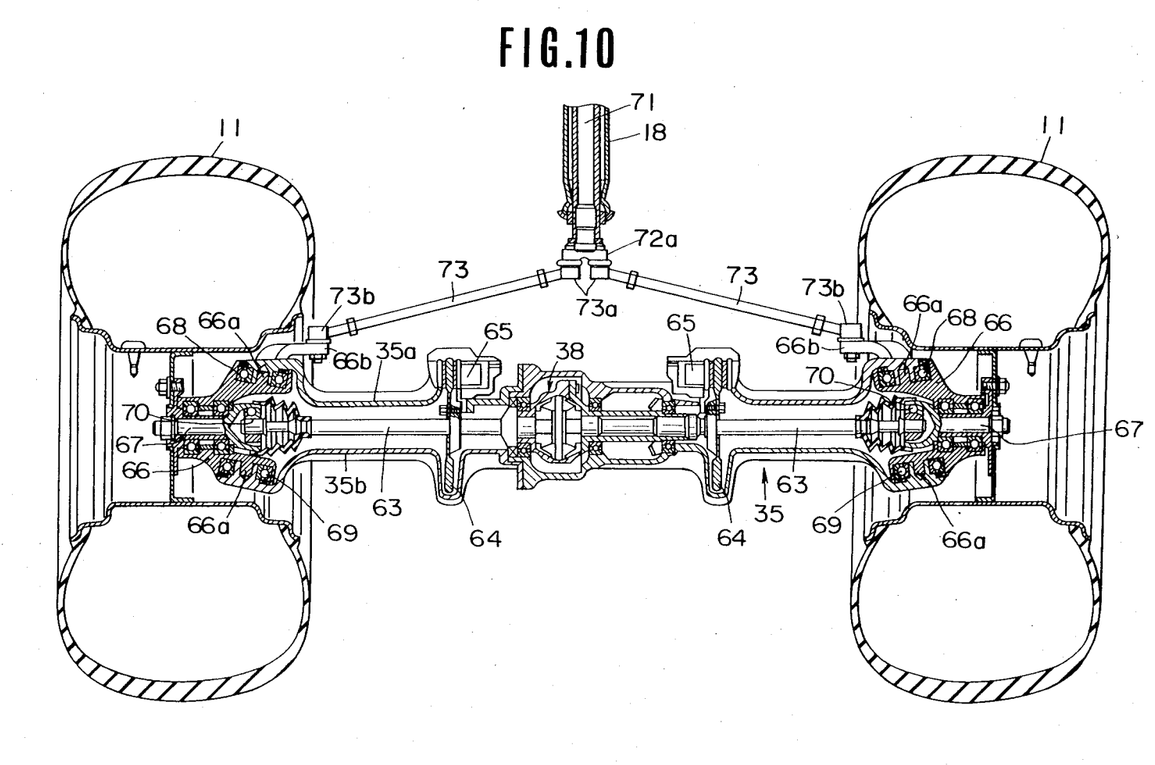
FIG. 10 is a cross-sectional view of a front axle housing taken along the axis of a front axle.

As shown in FIGS. 6 and 10, a brake system for braking the front wheels is provided in the front axle housing 35. The front axle housing 35 is composed of separable upper and lower axle housing members 35a, 35b which are coupled to each other by bolts and nuts (not shown), the bolts extending through holes 35c defined in flanges formed on mating surfaces of the housing members 35a, 35b. The front brake system has brake disks 64 mounted on the front axles 63, and brake calipers 65 mounted on the front axle housing 35 in sandwiching relation to the brake disks 64. The front wheels 11 can be braked against rotation in response to operation of the brake calipers 65.

7. Steering System

As shown in FIG. 3 a steering stem 71 is fitted in the head pipe 18 of the body frame 10 for substantially horizontal angular movement about its own axis. The bar-shaped steering handle 15 is mounted on an upper end of the steering stem 71. A steering crank 72 is connected to a lower end of the steering stem 71. The steering crank 72 comprises a bell crank which has the first arm 72a extending to the front and the second arm 72b extending to the left side of the vehicle (FIG. 4).

As shown in FIG. 10, the front axle housing 35 is provided at the right and left ends thereof with a pair of knuckles 66 for rotatably supporting shafts 67 of the front wheels 11. Each knuckle 66 has a pair of upper and lower kingpins 66a and a knuckle arm 66b. The first arm 72a of the steering crank 72 is linked to the knuckle arm 66b though ball joints 73a, front tie rods 73, and ball joints 73b. The upper and lower axle housing members 35a, 35b of the front axle housing 35 have on each of their opposite ends a kingpin recess and a bearing sleeve. The pair of kingpins 66a of the front knuckle 66 is fitted in the kingpin recesses of the housing members 35a, 35b, while the front knuckle 66 is fitted in the bearing sleeves of the housing members 35a, 35b, with bearings 68, 69 interposed. The pair of kingpins 66a are aligned with the bearings 68, 69 so that the knuckle 66 is angularly movable about the axis of the kingpins 66a. The outer end of the front axle 63 and the inner end of the front wheel shaft 67 are coupled via a constant-velocity joint 70 which is aligned with the axis of the kingpins 66a.

As illustrated in FIG. 5, the rear axle housing 33 has opposite ends with the same construction as that of the front axle housing 35, and rear knuckles 74, 75 are of the same construction as that of the front knuckles 66 and are angularly movable. Further, as shown in FIG. 4, each of the rear knuckles 74, 75 have tie rod arms 74a, 75a provided at the back thereof, while only the right rear knuckle 74 has a knuckle arm 74b provided in the front thereof.

Also, similar to the construction of the front axles, the rear axles 93 have outer ends coupled via the constant-velocity joints 95 to rear wheel shafts 94 which are rotatably mounted on the rear knuckles 74, the rear wheels 13 being securely attached to the rear wheel shafts 94 (FIG.5).

As shown in FIGS. 3 and 4, the steering system of the vehicle includes a rear bell crank 77 which is horizontally swingably supported on the casing of the engine 27. The laterally extending second arm 72b of the steering crank 72 and one arm of the rear bell crank 77 are interconnected through a steering rod 76, (the central portion of which is broken away for clarity of the drawings) which has the front and rear ends thereof pivotably connected with the former through a ball joint 76a and with the latter through a ball joint 76b, respectively. The other end of the rear bell crank 77 is coupled through a ball joint 78a, a drag link 78, and a ball joint 78b to the knuckle arm 74b of the right rear knuckle 74. The tie rod arms 74a, 75a are connected to respective ends of a tie rod 79 through ball joints 79a so as to be interconnected with each other.

Due to this arrangement of the steering system, the front wheels 11 and the rear wheels 13 are steered interlockingly in the opposite directions upon the operation of the steering handle 15.

8. Engine Intake and Exhaust System

Figure 8:
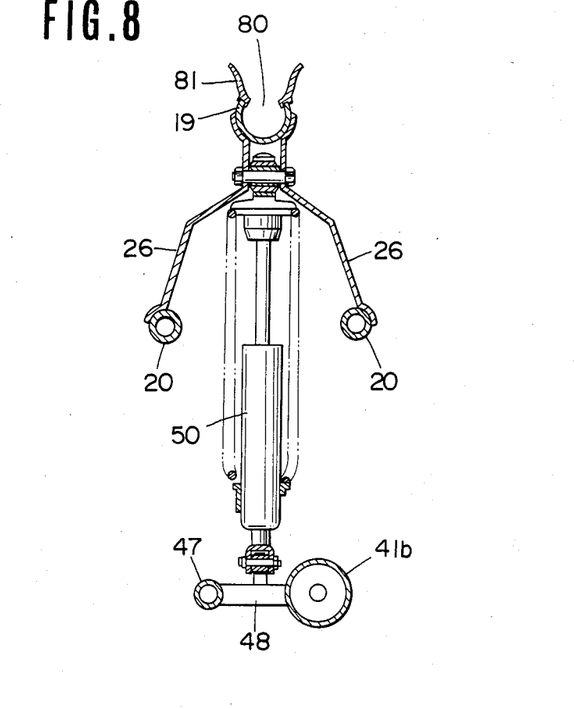
FIG. 8 is a cross-sectional view taken along line 8—8 of FIG. 3.
Figure 9:
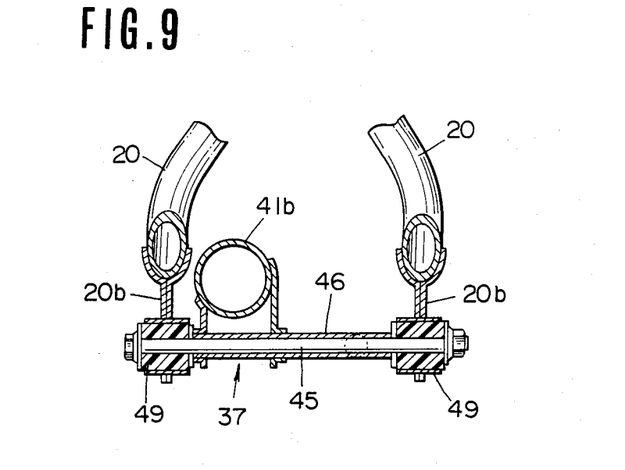
FIG. 9 is a cross-sectional view taken along line 9—9 of FIG. 3.

As illustrated in FIGS. 3 and 8, the backbone tube 19 of the body frame 10 has an intake port 80 defined in a front upper surface thereof, with a rubber intake duct 81 fitted in the intake port 80. The backbone tube 19 has a rear end connected through a rubber connector tube 83 to an inlet port (not shown) of an air cleaner 82, which has outlet ports connected through connector pipes 84a, 84b, to front and rear carburetors 85a, 85b for the front and rear cylinders 28, 29.

As shown in FIG. 3, exhaust pipes 86a, 86b for the front and rear cylinders 28, 29 are connected to an exhaust muffler 87 which is disposed above the rear axle housing.

9. Other Accessories

As depicted in FIG. 3, a fuel tank 88 (shown in phantom line) is disposed at the back of the head tube 18. A battery 89 is disposed substantially above the rear carburetor 85b. A headlight 90 and a radiator 91 are vertically spaced from each other and located in front of the head tube 18, the radiator 91 being connected through a water hose (not shown) to the engine 27. cl 10. Arrangement of Wheels, Engine and Footrests As shown in FIGS. 1 and 2, the vehicle has an arrangement of the wheels 11, 12, 13, the engine 27 and the footrests 16a as described hereinafter. Firstly, the engine 27 is disposed between the middle axle 62 and the rear axle 93 and adjacent the middle axle 62. Secondly, the footrests 16a are disposed between the front wheels 11 and the middle wheels 12. In this arrangement, the distance between the front axle 63 and the middle axle 62 is greater than that between the middle axle 62 and the rear axle 93 due to the position of the footrest. Since the weight of the engine is much heavier than that of any other element mounted on the frame, as well as being heavier than the operator with an ordinary physique, this arrangement results in a substantially equalized load on each wheel, which is advantageous for offroad running.

11. Modification of the Preferred Embodiment

Figure 11:
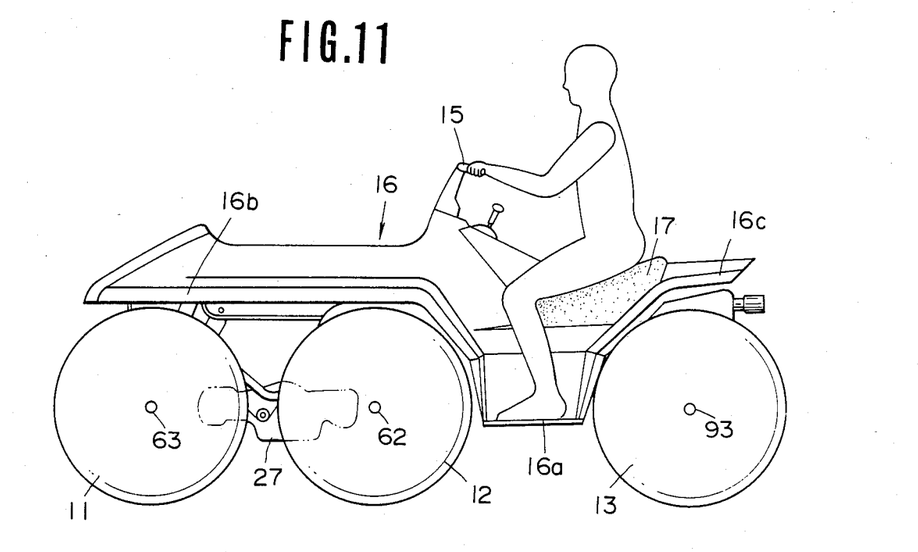
FIG. 11 is a side elevational view of a six-wheeled motor vehicle according to a modification of the preferred embodiment of the present invention.
Figure 12:
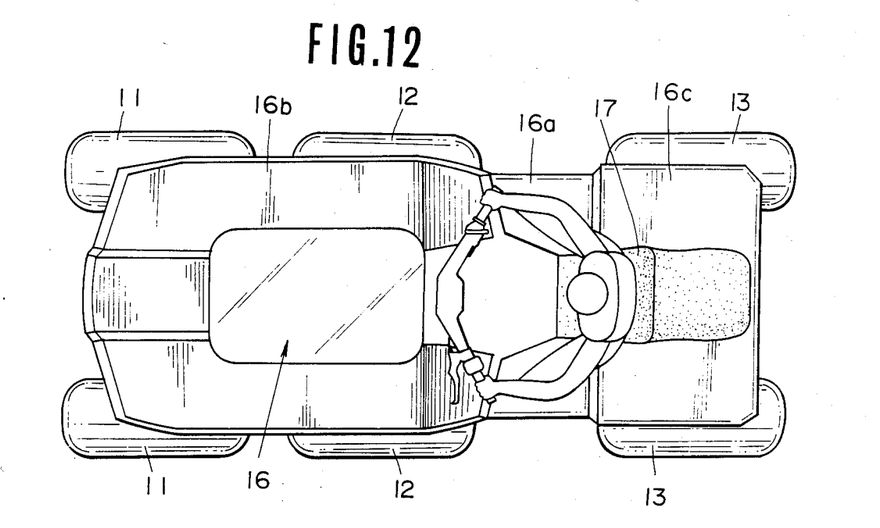
FIG. 12 is a plan view of the vehicle shown in FIG. 11.

FIGS. 11 and 12 show a modification of the vehicle as described hereinbefore referring to FIGS. 1 through 10. In FIGS. 11 and 12, the same reference numerals indicate the same or corresponding elements as those in FIGS. 1 and 2. This modification is obtained from the embodiment of FIGS. 1 through 10 by converting the front to the rear concerning the wheel suspensions, the engine and the power transmitting system. As a result, the front leading arm and the rear trailing arm of the vehicle of the modification have the same constructions that the rear trailing arm 36 and the front leading arm 37 of the vehicle in FIGS. 1 through 10 have, respectively. In this vehicle in FIGS. 11 and 12, the distance between the middle axle 62 and the rear axle 93 in greater than that between the front axle 63 and the middle axle 62. The engine 27 of heavy weight is disposed between the front axle 63 and the middle axle 62 and adjacent the middle axle 62. The footrest 16a for the operator is disposed between the middle wheel 12 and the rear wheel 13. Due to these structures, the vehicle in FIGS. 11 and 12 can achieve the same weight distribution advantages as that of the vehicle in FIGS. 1 through 10.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A six-wheel motor vehicle, comprising:
a frame;
a pair of front wheels provided with front axles;
a pair of rear wheels provided with rear axles;
a pair of middle wheels provided with middle axles and disposed between said front wheels and said rear wheels;
support means for supporting said front, middle and rear wheels on said frame;
drive means for driving said front, middle and rear wheels;
said drive means including an engine mounted on said frame;
said engine being disposed between said middle axles and said rear axles;
the distance between said front axles and said middle axles being greater than that between said middle axles and said rear axles;
steering means including a bar-shaped steering handle located above the front axles;
a covering body mounted on said frame and having a pair of front fenders over the pair of front wheels and a pair of rear fenders over the pairs of middle and rear wheels, said covering body covering substantially the entire vehicle;
a saddle seat on said covering body between the front axles and middle axles for allowing an operator to sit astride the vehicle; and
a pair of footrests integral with and extending between said pairs of front and rear fenders of the covering body, each footrest being in the form of a recess open upwardly and outwardly with outer extremeties of the footrests being being spaced inwardly from outer extremeties of said front and middle wheels, said footrests being disposed between said front wheels and said middle wheels at substantially the level of said front and middle axles whereby the operator's legs and feet are positioned between and inwardly of the front and middle wheels for comfort and safety.

2. A six-wheeled motor vehicle comprising:
a frame;
a pair of front wheels provided with front axles;
a pair of rear wheels provided with rear axles;
a pair of middle wheels provided with middle axles and disposed between said front wheels and said rear wheels;
the distance between said middle axles and said rear axles being greater than that between said front axles and said middle axles;
support means for supporting said front, middle and rear wheels on said frame;
drive means for driving said front, middle and rear wheels;
said drive means including an engine mounted on said frame;
said engine being disposed between said front axles and said middle axles; and
steering means including a bar-shaped steering handle located above the middle axles;
a covering body mounted on said frame and having a pair of front fenders over the pair of front and middle wheels and a pair of rear fenders over the pair of rear wheels, said covering body covering substantially the entire vehicle;
a saddle seat on said covering body between the rear axles and middle axles for allowing an operator to sit astride the vehicle; and
a pair of footrests integral with and extending between said pairs of front and rear fenders of the covering body, each footrest being in the form of a recess open upwardly and outwardly with outer extremeties of the footrests being spaced inwardly from outer extremeties of said rear and middle wheels, said footrests being disposed between said middle wheels and said rear wheels at substantially the level of said rear and middle axles whereby the operator's legs and feet are positioned between and inwardly of the rear and middle wheels for comfort and safety.

3. A six-wheeled motor vehicle according to claim 1, wherein:
said supporting means includes a front leading arm and a rear trailing arm;
said front leading arm supports at the right and left ends thereof said front wheels, and is vertically swingably suspended to said frame through a shock absorber; and
said rear trailing arm supports at the right and left ends thereof said rear wheels, and is vertically swingably suspended to said frame through a shock absorber.

4. A six-wheeled motor vehicle according to claim 2, wherein:
said supporting means includes a front leading arm and a rear trailing arm;
said front leading arm supports at the right and left ends thereof said front wheels, and is vertically swingably suspended to said frame through a shock absorber; and
said rear trailing arm supports at the right and left ends thereof said rear wheels, and is vertically swingably suspended to said frame through a shock absorber.

5. A six-wheeled motor vehicle according to claim 3, wherein:
said drive means includes a front differential connected to said front axles, a middle differential connected to said middle axles, a rear differential connected to said rear axles and a power transmitting shaft extending longitudinally to the vehicle and interconnecting said front, middle and rear differentials with each other.

6. A six-wheeled motor vehicle according to claim 4, wherein:
said drive means includes a front differential connected to said front axles, a middle differential connected to said middle axles, a rear differential connected to said rear axles and a power transmitting shaft extending longitudinally to the vehicle and interconnecting said front, middle and rear differentials with each other.

7. A six-wheeled motor vehicle comprising:
a frame;
a pair of front wheels provided with front axles;
a pair of rear wheels provided with rear axles;
a pair of middle wheels provided with middle axles and disposed between said front wheels and said rear wheels;
support means for supporting said front, middle and rear wheels on said frame;
drive means for driving said front, middle and rear wheels;
said drive means including an engine mounted on said frame;
a covering body mounted on said frame and having a pair of front fenders and a pair of rear fenders disposed at lateral sides of the vehicle, respectively;
a pair of footrests integral with said pairs of front and rear fenders of the covering body, each footrests being in the form of a recess and being opened upwardly and outwardly, outer ends of said pair of footrests being located closer to a longitudinal axis of the vehicle than the outer ends of said pairs of wheels;
steering means including a bar-shaped steering handle;
a saddle seat for allowing an operator to sit astride thereon;
said engine being disposed adjacent said middle axles and on one longitudinal side thereof; and
said footrests being disposed on the other longitudinal side of said middle wheels at substantially the level of said front and rear axles.

8. A six-wheeled motor vehicle according to claim 1, wherein the front wheels and rear wheels are steerable by the steering means.

9. A six-wheeled motor vehicle according to claim: 2, wherein the front wheels and rear wheels are steerable by the steering means.

10. A six-wheeled motor vehicle according to claim 7, wherein the front wheels and rear wheels are steerable by the steering means.

* * * * *